United States Patent
Choi et al.

(10) Patent No.: US 10,393,516 B2
(45) Date of Patent: *Aug. 27, 2019

(54) FLEXIBLE DISPLAY AND METHOD FOR MEASURING ANGLE OF THE SAME

(71) Applicant: Samsung Display Co., Ltd., Yongin-si, Gyeonggi-do (KR)

(72) Inventors: Jae-Won Choi, Yongin-si (KR); Chan-Sung Jung, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 311 days.

This patent is subject to a terminal disclaimer.

(21) Appl. No.: 15/277,020

(22) Filed: Sep. 27, 2016

(65) Prior Publication Data

US 2017/0016720 A1    Jan. 19, 2017

Related U.S. Application Data

(63) Continuation of application No. 13/912,471, filed on Jun. 7, 2013, now Pat. No. 9,476,704.

(30) Foreign Application Priority Data

Jan. 22, 2013    (KR) .......................... 10-2013-0007043

(51) Int. Cl.
    *G01B 21/22*    (2006.01)
    *G06F 1/16*     (2006.01)

(52) U.S. Cl.
    CPC .......... *G01B 21/22* (2013.01); *G06F 1/1643* (2013.01); *G06F 1/1652* (2013.01); *G06F 1/1677* (2013.01); *G06F 2200/1637* (2013.01)

(58) Field of Classification Search
    CPC ........ G06F 1/16; G06F 1/1641; G06F 1/1652; G06F 1/1643; G01B 21/02; G01B 21/22
    (Continued)

(56) References Cited

U.S. PATENT DOCUMENTS

| 4,570,354 A | * | 2/1986 | Hindes .................. G01B 5/213 33/534 |
| 4,897,927 A | * | 2/1990 | Nicol .................. A61B 5/1071 33/512 |

(Continued)

FOREIGN PATENT DOCUMENTS

| KR | 10-2007-0111364 A | 11/2007 |
| KR | 10-2010-0082451 A | 7/2010 |

(Continued)

OTHER PUBLICATIONS

European Search Report dated Nov. 7, 2013 by EPO in connection with European Patent Application No. 13180832.1 which also claims Korean Patent Application No. 10-2013-0007043 as its priority document.

(Continued)

*Primary Examiner* — Christopher W Fulton
(74) *Attorney, Agent, or Firm* — H.C. Park & Associates, PLC

(57) ABSTRACT

There is provided a flexible display capable of improving an angle-measuring accuracy using different kinds of sensors and a method of measuring an angle thereof. The flexible display includes a first sensor unit disposed in a first region and including different kinds of sensors, a second sensor unit disposed in a second region adjacent to the first region and including different kinds of sensors, and an angle-measuring unit measuring a folding angle between the first region and the second region in response to sensing signals outputted from the first sensor unit and the second sensor unit.

9 Claims, 3 Drawing Sheets

(58) Field of Classification Search
USPC .................. 33/303, 355 R, 356, 343, 534
See application file for complete search history.

(56) References Cited

U.S. PATENT DOCUMENTS

| | | | |
|---|---|---|---|
| 4,940,063 A * | 7/1990 | Challis | A61B 5/1071 33/512 |
| 7,584,808 B2 | 9/2009 | Dolgin et al. | |
| 8,271,047 B2 * | 9/2012 | Kim et al. | G06F 1/1615 345/156 |
| 8,543,166 B2 | 9/2013 | Choi et al. | |
| 8,613,394 B2 | 12/2013 | Cohen et al. | |
| 9,122,319 B2 | 9/2015 | Kwak et al. | |
| 9,164,593 B2 | 10/2015 | Chae et al. | |
| 9,476,704 B2 * | 10/2016 | Choi | G01B 21/22 |
| 2002/0103610 A1 | 8/2002 | Bachmann et al. | |
| 2006/0238494 A1 | 10/2006 | Narayanaswami et al. | |
| 2006/0274036 A1 * | 12/2006 | Hioki et al. | G06F 3/0412 345/156 |
| 2007/0000140 A1 | 1/2007 | Sato | |
| 2007/0156364 A1 | 7/2007 | Rothkopf | |
| 2007/0268264 A1 | 11/2007 | Aarras et al. | |
| 2008/0250661 A1 | 10/2008 | Kou et al. | |
| 2010/0011291 A1 | 1/2010 | Nurumi | |
| 2010/0045705 A1 | 2/2010 | Vertegaal et al. | |
| 2010/0064536 A1 | 3/2010 | Caskey et al. | |
| 2010/0103133 A1 | 4/2010 | Park et al. | |
| 2010/0120470 A1 | 5/2010 | Kim et al. | |
| 2010/0182265 A1 | 7/2010 | Kim et al. | |
| 2010/0188328 A1 | 7/2010 | Dodge et al. | |
| 2012/0192114 A1 | 7/2012 | DeLuca | |
| 2013/0090881 A1 | 4/2013 | Janardhanan et al. | |
| 2013/0093660 A1 | 4/2013 | Hirsch et al. | |
| 2013/0222276 A1 | 8/2013 | Kim et al. | |
| 2013/0271351 A1 | 10/2013 | Lyons et al. | |
| 2013/0345972 A1 | 12/2013 | Askarpour | |
| 2014/0098075 A1 | 4/2014 | Kwak et al. | |
| 2014/0098095 A1 | 4/2014 | Lee et al. | |
| 2014/0101560 A1 | 4/2014 | Kwak et al. | |
| 2015/0187325 A1 | 7/2015 | Yeo et al. | |
| 2015/0220119 A1 | 8/2015 | Seo et al. | |

FOREIGN PATENT DOCUMENTS

| | | |
|---|---|---|
| KR | 10-2011-0028650 | 3/2011 |
| KR | 10-2011-0046886 | 5/2011 |
| KR | 10-2013-0006757 | 1/2013 |

OTHER PUBLICATIONS

The European Office Action dated Oct. 12, 2017, issued in European Patent Application No. 13180632.1.
Office Action dated Jan. 29, 2019 issued in Korean Patent Application No. 10-2013-0007043.
Yong-Min Kim, et al, "An Aggregate Detection Method for Improved Sensitivity using Correlation of Heterogeneous Intrusion Detection Sensors", Journal of The Korea Institute of Information Security and Cryptology, vol. 12, No. 4, Aug. 2002, pp. 29-39.

* cited by examiner

FLEXIBLE DISPLAY AND METHOD FOR MEASURING ANGLE OF THE SAME

CLAIM OF PRIORITY

This application makes reference to, incorporates the same herein, and claims all benefits accruing under 35 U.S.C. § 120 from, and is a Continuation of an application for FLEXIBLE DISPLAY AND METHOD FOR MEASURING ANGLE OF THE SAME, earlier filed in the United States Patent and Trademark Office on 7 Jun. 2013 and their duly assigned Ser. No. 13/912,471, which claims priority under 35 U.S.C § 119 from an application earlier filed in the Korean Intellectual Property Office on Jan. 22, 2013 and duly assigned Serial No. 10-2013-0007043.

BACKGROUND OF THE INVENTION

Field of the Invention

Embodiments of the present invention generally relate to a flexible display and a method of measuring an angle thereof, and more particularly, to a flexible display having improved accuracy of measuring an angle using different kinds of sensor and a method of measuring an angle thereof.

Description of the Related Art

In recent information society, displays are emphasized as an important device for delivering visual information. Low power consumption, a thin body, a lightweight body, and high definition are recent trends for the displays.

A flexible display that is not damaged even in case of being folded and rolled has been spotlighted as a newly developed technology in the field of displays. This display is implemented on a thin substrate such as a plastic and is not damaged even by folding or rolling. Nowadays, 1 mm or thinner organic light emitting devices or liquid crystal devices are employed to implement the flexible displays.

In recent years, technologies of measuring an angle of the flexible display, such as a folding angle or a bending angle and controlling the flexible display using the measured angle have been developed.

In the existing flexible display, a step motor or a single kind of sensors are utilized to measure the folding angle or bending angle of the flexible display. However, the angle measured as described above may not be accurate.

SUMMARY OF THE INVENTION

Accordingly, the present invention has been made to provide a flexible display capable of improving angle-measuring accuracy using different kinds of sensors and a method of measuring an angle thereof.

In order to achieve the foregoing and/or other aspects of the present invention, there is provided a flexible display including a first sensor unit disposed in a first region and including different kinds of sensors, a second sensor unit disposed in a second region adjacent to the first region and including different kinds of sensors, and an angle-measuring unit measuring a folding angle between the first region and the second region in response to sensing signals outputted from the first sensor unit and the second sensor unit.

According to an embodiment of the present invention, the angle-measuring unit may include a first angle estimator calculating a first angle between the first region and the second region in response to first sensing signals outputted from a first kind of sensors included in the first sensor unit and the second sensor unit respectively, a second angle estimator calculating a second angle between the first region and the second region in response to second sensing signals outputted from a second kind of sensors included in the first sensor unit and the second sensor unit respectively, and an averaging unit outputting an average value between the first angle and the second angle as the folding angle.

According to an embodiment, the different kinds of sensors may include at least two kinds of sensor from a group of a gyroscope sensor, an acceleration sensor, and a terrestrial magnetism sensor.

According to an embodiment, the flexible display array farther include a third sensor unit disposed in a third region adjacent to the first region and including different kinds of sensors, and the angle-measuring sensor calculates an angle between the first region and the third region in response to sensing signals outputted from the first sensor unit and the third sensor unit.

According to an embodiment, when each of the first sensor unit and the second sensor unit includes at least three different kinds of sensors, the angle-measuring unit may measure the folding angle in response to sensing signals outputted from two of the at least three different kinds of sensors.

In order to achieve, the foregoing and/or other aspects of the present invention, there is provided a method of measuring an angle of a flexible display including calculating a first angle between a first region and a second region in response to first sensing signals outputted from a first kind of sensors which are disposed in the first region and the second region adjacent to the first region, calculating a second angle between the first region and the second region in response to second sensing signals outputted from a second kind of sensor which are disposed in the first region and the second region, and outputting an average value between the first angle and the second angle as a folding angle between the first region and the second region.

According, to an embodiment, the first kind of sensors may be any one of a group of a gyroscope sensor, an acceleration sensor, and a terrestrial magnetism sensor, while the second kind of sensors may be any another one of a group of a gyroscope sensor, an acceleration sensor, and a terrestrial magnetism sensor.

According, to the flexible display according to an embodiment of the present invention and the method of measuring an angle thereof, angle-measuring accuracy can be improved using different kinds of sensors.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION OF THE INVENTION

Figure 1:
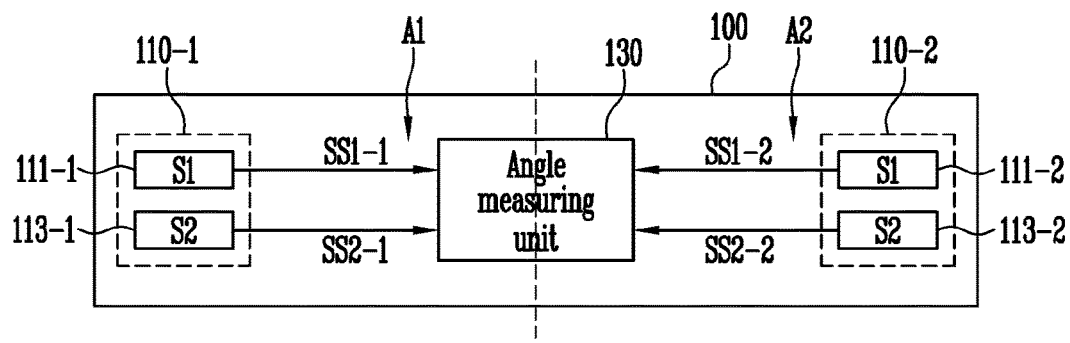
FIG. 1 is a view illustrating a flexible display constructed as an embodiment according to the principles of the present invention.

Hereinafter, certain exemplary embodiments according to the present invention will be described with reference to the accompanying drawings. Here, when a first element, is described as being coupled to a second element, the first element may be not only directly coupled to the second element but may also be indirectly coupled to the second element via a third element. Further, some of the elements that are not essential to the complete understanding of the invention are omitted for clarity. Also, like reference numerals refer to like elements throughout.

Hereinafter, embodiments of the present invention will be described in detail with reference to the accompanying drawings.

Figure 2:
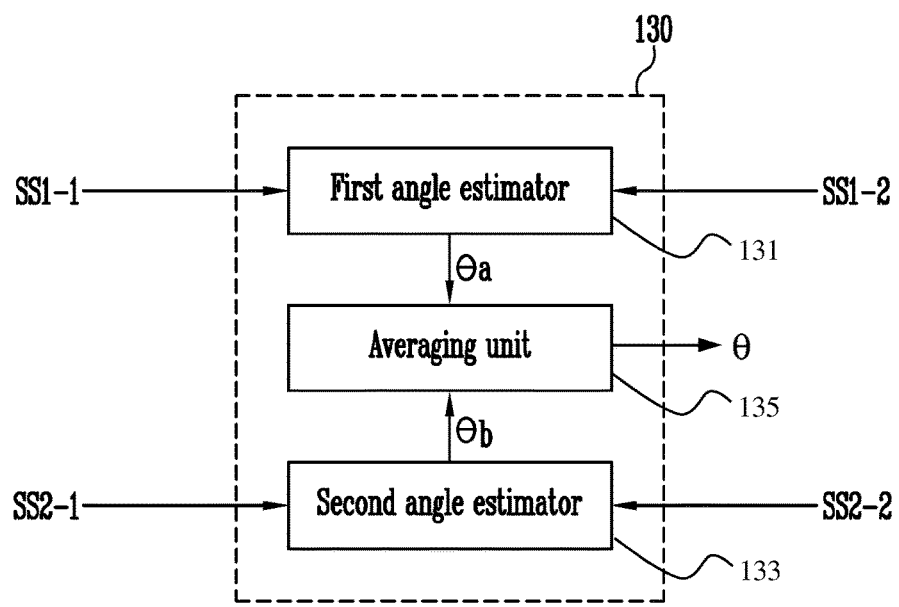
FIG. 2 is a view illustrating an angle measuring, unit shown in FIG. 1.

FIG. 1 is a view illustrating a flexible display constructed as an embodiment according to the principles of the present invention. FIG. 2 is a view illustrating an angle measuring unit shown in FIG. 1.

In FIG. 1, an angle measuring unit 130 is arranged between a first region A1 and a second region A2 of a flexible display 100, but the present invention is not limited by this. For example, the angle measuring unit 130 may be arranged in the first region A1 or it second region A2.

Referring to FIGS. 1 and 2, the flexible display 100 includes a first sensor unit 110-1, a second sensor unit 110-2, and the angel measuring unit 130.

The first sensor unit 110-1 is disposed in the first region A1 of the flexible display 100. The first sensor unit 110-1 includes different kinds of sensors 111-1 and 113-1.

FIG. 1 illustrates the first sensor unit 110-1 including two different kinds of sensors 111-1 and 113-1 for the illustrative purpose, but the present invention is not limited thereto. For example, the first sensor unit 110-1 may include three or more different kinds of sensors.

Each of different kinds of sensors 111-1 and 113-1 may be a gyroscope sensor, an acceleration sensor, or a terrestrial magnetism sensor, but the present invention not limited thereto.

For example, the first sensor 111-1 may be any one of a gyroscope sensor, an acceleration sensor, and a terrestrial magnetism sensor, while the second sensor 113-1 may be any another one of a gyroscope sensor, an acceleration sensor, and a terrestrial magnetism sensor.

Hereinafter, it is assumed that the first sensor 111-1 is a gyroscope sensor and the second sensor 113-1 is an acceleration sensor.

The first sensor 111-1 senses an azimuth angle of the first region A1, based on an angular acceleration of the first region A1, vertical slope, and horizontal slope and outputs a first sensing signal SS1-1 corresponding to the sensed azimuth angle, vertical slope, and horizontal slope to the angle measuring unit 130.

The second sensor 113-1 senses an azimuth angle of the first region A1, based on an acceleration of the first region A1, vertical slope, and horizontal slope and outputs a second sensing signal SS2-1 corresponding to the sensed azimuth angle, vertical slope, and horizontal slope to the angle measuring unit 130.

The second sensor unit 110-2 is disposed in the second region A2 of the flexible display 100. The second sensor unit 110-2 includes different kinds of sensors 111-2 and 113-2.

The different kinds of sensors 111-2 and 113-2 included in the second sensor unit 110-2 and the different kinds of sensors 111-1 and 113-1 included in the first sensor unit 110-1 are same kind of sensors. For example, the first sensor 111-2 of the second sensor unit 110-2 and the first sensor 111-1 of the first sensor unit 110-1 are same kind of sensors, while the second sensor 113-2 of the second sensor unit 110-2 and the second sensor 113-1 of the first sensor unit 310-1 are same kind of sensors.

The first sensor 111-2 senses an azimuth angle of the second region A2, based on an angular acceleration of the second region A2, vertical slope, and horizontal slope and outputs a first sensing, signal SS1-2 corresponding to the sensed azimuth angle, vertical slope, and horizontal slope to the angle measuring unit 130.

The second sensor 113-2 senses an azimuth angle of the second region A2, based on an acceleration of the second region A2, vertical slope, and horizontal slope and outputs a second sensing signal SS2-2 corresponding to the sensed azimuth angle, vertical slope, and horizontal slope to the angle measuring unit 130.

The angle-measuring unit 130 measures an angle $\theta$ between the first region A1 and the second region A2 such as a folding angle or a bending angle, in response to the sensing signals SS1-1, SS2-1, SS1-2, and SS2-2 which are outputted from the first sensor unit 110-1 and the second sensor unit 110-2.

The angle-measuring unit 130 includes a first angle estimator 131, a second angle estimator 133, and an averaging unit 135.

The first angle estimator 131 estimates a first angle $\theta a$ in response to the first sensing signals SS1-1 and SS1-2 from the first sensors 111-1 and 111-2 and outputs the estimated first angle $\theta a$ to the averaging unit 135. Specifically, the first angle estimator 131 estimates an azimuth difference, a vertical slope difference, a horizontal slope difference between the first region A1 and the second region A2 based on the first sensing signals SS1-1 and SS1-2 and correspondingly outputs the estimated first angle $\theta a$ based on the differences to the averaging unit 135.

The second angle estimator 133 estimates a second angle $\theta b$ in response to the second sensing signals SS2-1 and SS2-2 from the second sensors 113-1 and 113-2 and outputs the estimated second angle $\theta b$ to the averaging unit 135. Specifically, the second angle estimator 133 estimates an azimuth difference, a vertical slope difference, a horizontal slope difference between the first region A1 and the second region A2 based on the second sensing signals S52-1 and SS2-2 and correspondingly outputs the second angle $\theta b$ based on the differences to the averaging unit 135.

The averaging, unit 135 calculates an average value between the first angle $\theta a$ and the second angle $\theta b$ and outputs the calculated average value as an angle $\theta$ between the first region A1 and the second region A2.

According to an embodiment, when the first sensor unit 110-1 and the second sensor unit 110-2 include three or more different kinds of sensors, respectively, the angle-measuring unit 130 may measure and output an angle $\theta$ using only the sensing signals received from two of the three different kinds of sensors.

For example, when difference between the angles measured by the gyroscope sensors and the angle measured by the acceleration sensors or the terrestrial magnetism sensors is too big, the averaging unit. 135 determines that the angles measured by the gyroscope sensors are not accurate, and may output an average value of the angles measured by the acceleration sensors and the terrestrial magnetism sensors as an angle $\theta$ between the first region A1 and the second region A2 without including the sensing signals measured by the gyroscope sensors.

Figure 3:
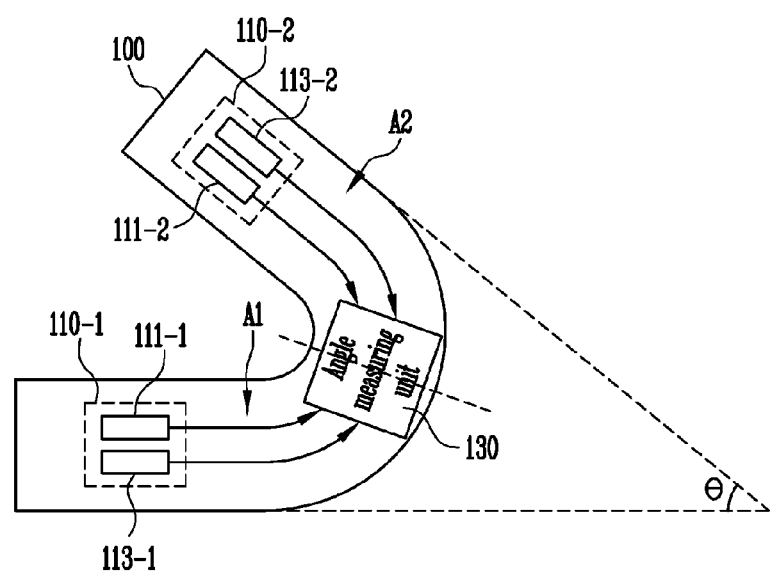
FIG. 3 is a view illustrating a method of measuring an angle of a flexible display shown in FIG. 1.

FIG. 3 is a view illustrating a method of measuring an angle of a flexible display shown in FIG. 1.

Referring to FIG. 3 when the flexible display 130 is folded or bent, the angle-measuring unit 130 measures an angle $\theta$ between the first region A1 and the second region A2 in response to the sensing signals SS1-1, SS2-1, SS1-2, and SS2-2 outputted from the first sensor unit 110-1 and the second sensor unit 110-2.

The angle-measuring unit 130 receives the first sensing signal SS1-1 and the second sensing signal SS2-1, containing the information on the azimuth angles, the vertical slopes, and the horizontal slopes of the first region A1 respectively, from the first sensor unit 110-1 disposed in the first region A1. Moreover, the angle-measuring unit 130 receives the first sensing signal SS1-2 and the second sensing signal SS2-2 containing information on the azimuth angles, the vertical slopes, and the horizontal slopes of the second region A2 respectively, from the second sensor unit 110-2 disposed in the second region A2.

The angle-measuring unit 130 calculates a first angle θ1 based on the first sensing signals SS1-1 and SS1-2 and a second angle θ2 based on the second sensing signals SS2-1 and SS2-2, and outputs an average value between the first angle θa and the second angle θb as an angle θ.

Figure 4:
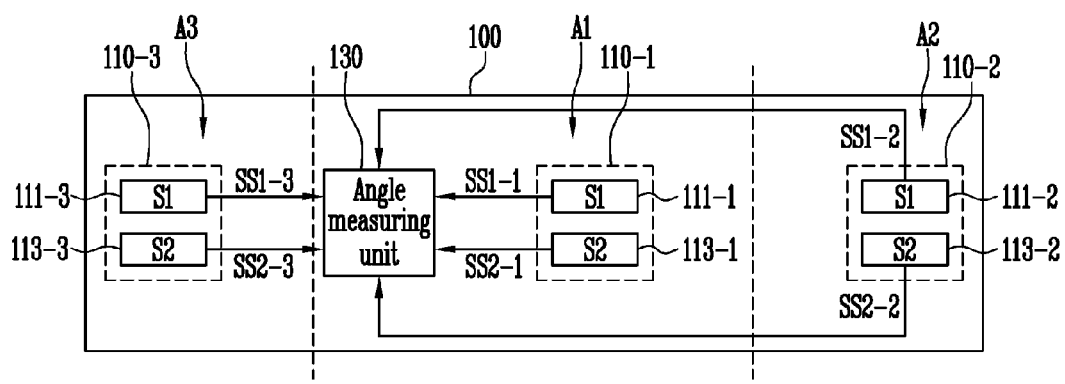
FIG. 4 is a view illustrating a flexible display constructed as another embodiment according to the principles of the present invention.

FIG. 4 is a view illustrating a flexible display according to another embodiment of the present invention. Referring to FIG. 4, a flexible display 100 includes a first sensor unit 110-1, a second sensor unit 110-2, a third sensor unit 110-3, and an angle-measuring unit 130.

Since the first sensor unit 110-1 and the second sensor unit 110-2 have the same functions and operations as those of the first sensor unit 110-1 and the second sensor unit 110-2, their descriptions will be omitted.

The third sensor unit 110-3 is disposed in a third region A3 of the flexible display 100. The third sensor unit 110-3 includes different kinds of sensors 111-3 and 113-3.

The different kinds of sensors 111-3 and 113-3 included in the third sensor unit 110-3 and the different kinds of sensors 111-1 and 113-1 included in the first sensor unit 110-1 are same kind of sensors. The different kinds of sensors 111-2 and 113-2 included in the second sensor unit 110-2 and the different kinds of sensors 111-1 and 113-1 included in the first sensor unit 110-1 are same kind of sensors. For example, the first sensor 111-3 of the third sensor unit 110-3 and the first sensor 111-1 of the first sensor unit 110-1 are same kind of sensors, while the second sensor 113-3 of the third sensor unit 110-3 and the second sensor 113-1 of the first sensor unit 110-1 are same kind of sensors.

The angle-measuring unit 130 measures an angle θ1 between the first region A1 and the second region A2 in response to the sensing signals SS1-1, SS2-1, SS1-2, and SS2-2 which are outputted from the first sensor unit 110-1 and the second sensor unit 110-2.

Moreover, the angle-measuring unit 130 measures an angle θ2 between the first region A1 and the third region A3 in response to the sensing signals SS1-1, SS2-1, SS1-3, and SS2-3 which are outputted from the first sensor unit 110-1 and the third sensor unit 110-3.

Figure 5:
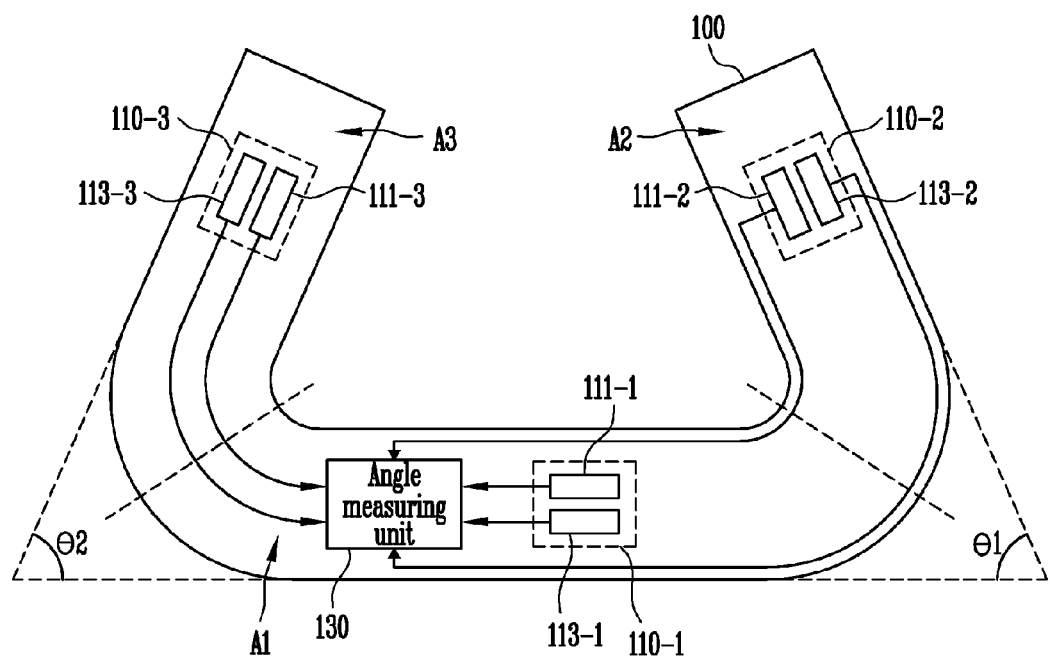
FIG. 5 is a view illustrating a method of measuring an angle of the flexible display shown in FIG. 4.

FIG. 5 is a view illustrating, a method of measuring an angle of the flexible display shown in FIG. 4.

When the flexible display 130 is folded or bent, the angle-measuring unit 130 measures an angle θ1 between the first region A1 and the second region A2 and an angle θ2 between the first region A1 and the third region A3, in response to the sensing signals SS1-1, SS2-1, SS1-2, SS2-2, SS1-3, and SS2-3 outputted from the first sensor unit 110-1 and the second sensor unit 110-2.

The angle-measuring unit 130 receives the first sensing signal SS1-1 and the second sensing signal SS2-1, containing information on the azimuth angles, the vertical slopes, and the horizontal slopes of the first region A1 respectively, from the first sensor unit 110-1 disposed in a reference region such as the first region A1.

The angle-measuring unit 130 receives the first sensing signal SS1-2 and the second sensing signal SS2-2, containing information on the azimuth angles, the vertical slopes, and the horizontal slopes of the second region A2 respectively, from the second sensor unit 110-2 disposed in a bending, region such as the second region A2.

The angle-measuring unit 130 receives the first sensing signal SS1-3 and the second sensing signal SS2-3, containing information on the azimuth angles, the vertical slopes, and the horizontal slopes of the third region A3 respectively, from the third sensor unit 110-3 disposed in another bending region such as the third region A3.

The angle-measuring unit 130 calculates an angle θ1 between the first region A1 and the second region A2 based on the first sensing signals SS1-1 and SS1-2 and the second sensing signal SS2-1 and SS2-2, and an angle θ2 between the first region A1 and the third region A3 based on the first sensing signals SS1-1 and SS1-3 and the second sensing signals SS2-1 and SS7-3.

The flexible display 100 according to the embodiments of the present invention can improve accuracy of measuring an angle by measuring the folding angle or the bending angle of the flexible display using different kinds of sensors. For example, an angle measured with an acceleration sensor in the external environment where the acceleration sensor may not work accurate, for example the inside of a traveling vehicle is compensated by an angle measured with a gyroscope sensor, so that the angle-measuring accuracy can be improved.

FIG. 1 shows the flexible display 100 including two sensor units 110-1 and 110-2 and FIG. 4 shows the flexible display 100 including three sensor units 110-1, 110-2, and 110-3; however the present invention is not limited thereto. That is, the flexible display 100 may include four or more sensor units.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A flexible display, comprising:
   a plurality of sensor units disposed in different regions of the flexible display and including at least one sensor; and
   an angle-measuring unit configured to receive sensing signals outputted from the plurality of sensor units and measuring a folding angle between the different regions of the flexible display in response to the sensing signals.

2. The flexible display as claimed in claim 1, wherein each of the plurality of sensor units comprises at least one of a gyroscope sensor, an acceleration sensor, and a terrestrial magnetism sensor.

3. The flexible display as claimed in claim 1, wherein the angle-measuring unit measures the folding angle of the flexible display based on sensing signals outputted from a sensor unit disposed in a reference region of the flexible display and sensing signals outputted from a sensor unit disposed in a bending region of the flexible display adjacent to the reference region.

4. The flexible display as claimed in claim 1, wherein, when each of the plurality of sensor units includes at least two sensors, each of the plurality of sensor units includes different sensors that are operationally responsive to dissimilar stimuli.

5. The flexible display as claimed in claim 4, wherein the different sensors comprise at least two sensors selected from the group consisting of a gyroscope sensor, an acceleration sensor, and a terrestrial magnetism sensor.

6. The flexible display as claimed in claim 4, wherein the plurality of sensor units comprise:
   a first sensor unit disposed in a first region of the flexible display; and
   a second sensor unit disposed in a second region of the flexible display adjacent to the first region.

7. The flexible display as claimed in claim 6, wherein the angle-measuring unit comprises:
   a first angle estimator determining a first angle between the first region and the second region in response to first sensing signals outputted from a first pair of sensors respectively included in the first sensor unit and the second sensor unit, the first pair of sensors operationally responsive to a first stimulus;
   a second angle estimator determining a second angle between the first region and the second region in response to second sensing signals outputted from a second pair of sensors respectively included in the first sensor unit and the second sensor unit, the second pair of sensors operationally responsive to a second stimulus; and
   an averaging unit outputting an average value between the first angle and the second angle as the folding angle by averaging the first angle determined by the first angle estimator and the second angle determined by the second angle estimator.

8. The flexible display as claimed in claim 7, wherein, when each of the first sensor unit and the second sensor unit includes at least three different sensors, the angle-measuring unit measures the folding angle in response to sensing signals outputted from two of the at least three different sensors.

9. The flexible display as claimed in claim 6, wherein the plurality of sensor units further comprise a third sensor unit disposed in a third region adjacent to the first region and including different sensors that are operationally responsive to dissimilar stimuli, and
   wherein the angle-measuring unit calculates an angle between the first region and the second region in response to sensing signals outputted from the first sensor unit and the second sensor unit and an angle between the first region and the third region in response to sensing signals outputted from the first sensor unit and the third sensor unit.

* * * * *